(12) United States Patent
Richardson

(10) Patent No.: US 11,065,565 B1
(45) Date of Patent: Jul. 20, 2021

(54) QUICK DRAIN, LOW MESS, HYDROSTATIC TRANSMISSION FILTER AND PLUG ASSEMBLY

(71) Applicant: Parker-Hannifin Corporation, Cleveland, OH (US)

(72) Inventor: Jason Scot Richardson, Greeneville, TN (US)

(73) Assignee: Parker-Hannifin Corporation, Cleveland, OH (US)

(*) Notice: Subject to any disclaimer, the term of this patent is extended or adjusted under 35 U.S.C. 154(b) by 294 days.

(21) Appl. No.: 16/182,907

(22) Filed: Nov. 7, 2018

Related U.S. Application Data

(60) Provisional application No. 62/586,950, filed on Nov. 16, 2017.

(51) Int. Cl.
  *B01D 29/33* (2006.01)
  *B01D 35/26* (2006.01)
  *B01D 35/14* (2006.01)
  *F16H 39/04* (2006.01)

(52) U.S. Cl.
  CPC .............. *B01D 29/33* (2013.01); *B01D 35/14* (2013.01); *B01D 35/26* (2013.01); *F16H 39/04* (2013.01); *B01D 2201/291* (2013.01); *B01D 2201/34* (2013.01)

(58) Field of Classification Search
  CPC ........ B01D 29/33; B01D 35/14; B01D 35/16; B01D 35/26; B01D 2201/291; B01D 2201/34; F16H 39/04
  See application file for complete search history.

(56) References Cited

U.S. PATENT DOCUMENTS

| | | | | |
|---|---|---|---|---|
| 6,849,179 B1 * | 2/2005 | Taylor | ................. | B01D 35/027 210/223 |
| 6,953,019 B2 * | 10/2005 | Lee | ................. | B01D 35/153 123/196 R |
| 2002/0020660 A1 * | 2/2002 | Jainek | ................. | B01D 35/153 210/435 |
| 2014/0041576 A1 * | 2/2014 | Clark | ................. | B01D 35/16 118/70 |

* cited by examiner

*Primary Examiner* — Patrick Orme
(74) *Attorney, Agent, or Firm* — Renner, Otto, Boisselle & Sklar, LLP

(57) ABSTRACT

A filter component includes a cartridge portion including a filter media, and a plug assembly on which the cartridge portion is mounted and in fluid communication with the cartridge portion. The plug assembly comprises a first plug and a second plug, the first plug being larger than the second plug. The second plug is fixed to an inner surface of the first plug in an installed state and is removable from the first plug in a draining state. The first plug further defines a drain port, wherein in the installed state the second plug plugs the drain port and in a draining state the second plug is removed from the first plug to permit draining fluid through the drain port. The filter component may be incorporated into a hydrostatic transmission to permit controlled draining of fluid from the hydrostatic transmission that does not result in an oil mess.

20 Claims, 9 Drawing Sheets

QUICK DRAIN, LOW MESS, HYDROSTATIC TRANSMISSION FILTER AND PLUG ASSEMBLY

RELATED APPLICATIONS

This application claims the benefit of U.S. Provisional Application No. 62/586,950 filed Nov. 16, 2017, which is incorporated herein by reference.

FIELD OF INVENTION

The present invention relates generally to filter assemblies used in transmission systems, and more particularly to filter assemblies for hydrostatic transmissions for use in light vehicles, such as turf mowing machines and zero-turn radius vehicles.

BACKGROUND

A prime mover, such as an internal combustion engine or the like, can be connected to a hydrostatic transmission to drive a wheel in a light vehicle. A hydrostatic transmission is particularly suitable to provide traction drive for light vehicles such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

Generally, a hydrostatic transmission includes a variable displacement hydraulic pump connected in a closed hydraulic circuit with a fixed or variable displacement hydraulic motor. The hydraulic pump usually is a piston-type pump including a plurality of reciprocating pistons, which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above. In some vehicles, such as zero-turn-radius mowers, separate hydraulic pumps and motors are used to independently drive separate wheels of an axle. By independently driving the wheels in opposite directions, for example, the vehicle can be made to turn with zero radius. Zero-turn-radius mowers are increasingly popular as the size and costs of such mowers decrease.

Components of a hydrostatic transmission typically are contained within a common housing. The internal space defined by the hydrostatic transmission housing further functions as a reservoir for the hydraulic fluid that flows through the closed circuit of the system. The fluid pathway includes a filter component that filters the hydraulic fluid. The filter component conventionally is maintained in place by a threaded fastening element, such as plug that may be threaded onto the housing. The filter element and the hydraulic fluid must be changed periodically, which is accomplished by unthreading the filter element from the housing. With conventional configurations, however, as the filter element is loosened from the housing, the internal space of the housing becomes substantially exposed through the large hole where the filter component extends into the housing. As a result, hydraulic fluid spills out from the housing rapidly and in an uncontrolled manner, which is messy and inconvenient and time-consuming to clean up.

SUMMARY OF INVENTION

A hydrostatic transmission filter component includes a cartridge portion and a plug assembly with a smaller drain plug combined with a larger housing plug. The plug assembly allows the hydrostatic transmission to be drained of hydraulic fluid in a fast, but more controlled manner as compared to conventional configurations to minimize oil mess.

The plug assembly of the filter component includes a first relatively smaller drain plug that fits within a second larger housing plug. When changing the hydraulic fluid, the larger filter plug is loosened, which pulls the filter cartridge portion off a seal seat in the transmission housing. This permits the hydraulic fluid to bypass the filter component and travel out through the smaller drain plug in a more controlled fashion as compared to conventional configurations. Providing a "no mess" smaller drain plug within a larger housing plug allows draining without a large diameter threaded joint, typical of conventional cartridge filters, which prevents oil mess.

The larger housing plug may include a connector having projections that engage with the filter cartridge portion for easy filter removal and replacement. The filter cartridge portion may include an end cap having top hat design to self-align with the hydrostatic transmission housing upon installation of the filter component within the housing, and a filter seat having a stepped configuration to engage with cooperating surface of the housing. In addition, the larger housing plug may include a threaded and/or stepped inner surface for cooperating with a complementary threaded and/or stepped outer surface of the smaller drain plug for permitting the quick drain function.

An aspect of the invention, therefore, is an enhanced filter component that provides for a low mess, quick drain function to drain fluid. In exemplary embodiments, the filter component includes a cartridge portion including a filter media for filtering a fluid and defining a fluid flow path for fluid being filtered, and a plug assembly on which the cartridge portion is mounted and in fluid communication with the cartridge portion. The plug assembly comprises a first plug and a second plug, the first plug being larger than the second plug. The second plug is fixed to an inner surface of the first plug in an installed state and is removable from the first plug in a draining state, and the first plug defines a first flow path for communicating fluid from the fluid flow path of the cartridge portion to an outside of the filter component. The first plug further defines a drain port separate from the first flow path, wherein in the installed state the second plug plugs the drain port and in a draining state the second plug is removed from the first plug to permit draining fluid through the drain port.

The enhanced filter component may be incorporated into a hydrostatic transmission including a housing defining a fluid reservoir, a pump assembly that pumps the fluid through the hydrostatic transmission, and the filter component, wherein in the installed state the pump assembly pumps the fluid through the filter component to filter the fluid. In the installed state, the cartridge portion extends through a hole in the housing and the first plug tightly engages the housing to prevent leakage of fluid from the fluid reservoir through the hole. The housing defines porting in fluid communication with the first flow path defined by the first plug such that in the installed state, fluid flows through the first flow path defined by the first plug and into the porting defined by the housing. In the draining state, the first plug is loosened from the housing whereby the housing and the filter component define a draining flow path external from the cartridge portion through which the fluid flows into the drain port.

In exemplary embodiments, the cartridge portion of the filter element includes a filter seat that defines a recess that receives the filter media, and a sealing element positioned on an upper face of the filter seat. The housing includes a sealing seat against which the sealing element seals in the installed state, and the sealing element is removed from the sealing seat in the draining state. The sealing element may be configured as an SAE-compliant face seal having a flat sealing surface. The first plug includes a connector having a plurality of ridged projections that provide a snap fit between the plug assembly and the cartridge portion by engagement with the filter seat.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
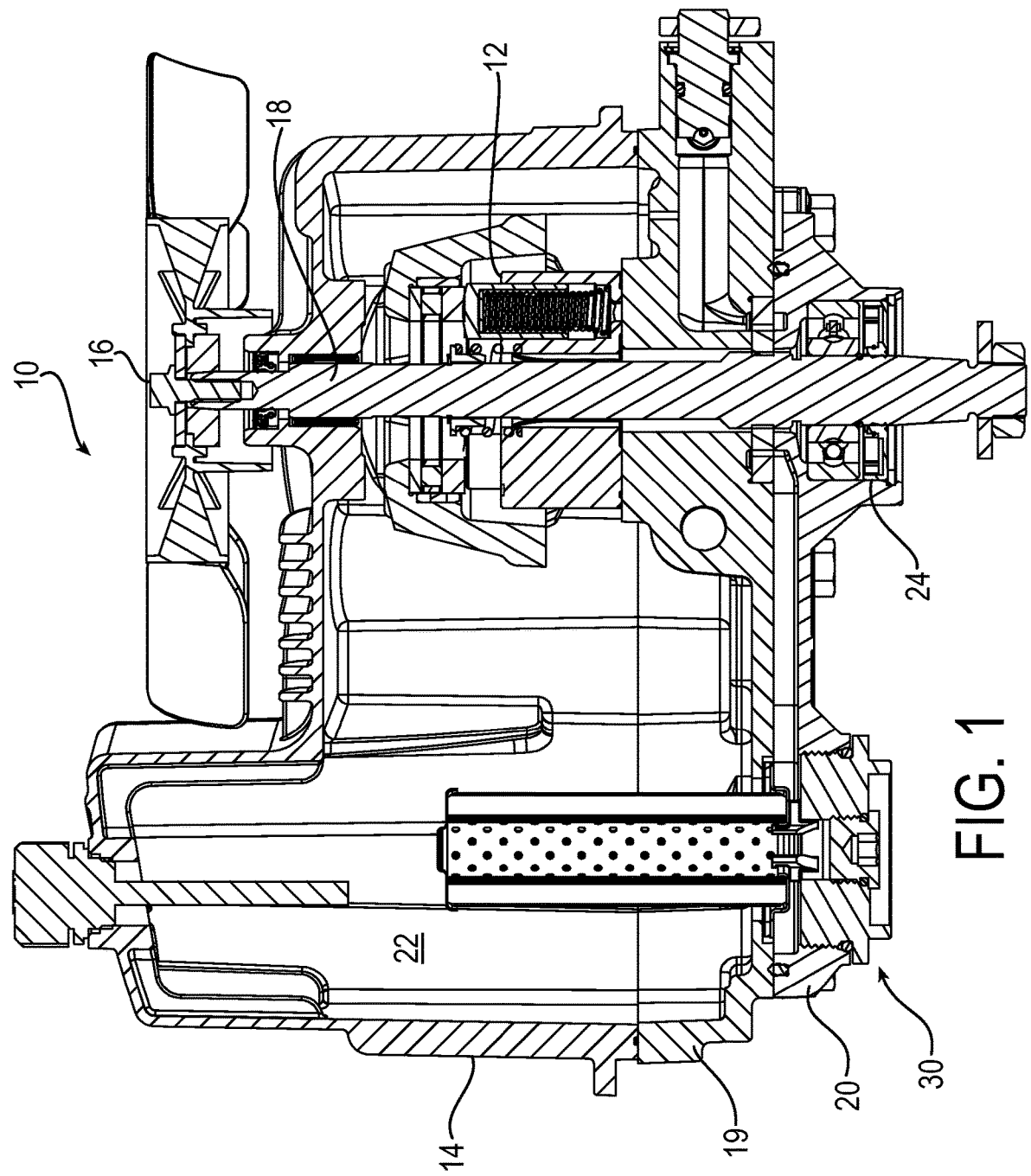
FIG. 1 is a drawing depicting a cross-sectional view of an exemplary hydrostatic transmission with a filter component in accordance with embodiments of the present invention.

Embodiments of the present invention will now be described with reference to the drawings, wherein like reference numerals are used to refer to like elements throughout. It will be understood that the figures are not necessarily to scale.

FIG. 1 is a drawing depicting a cross-sectional view of an exemplary hydrostatic transmission 10 with a filter component 30 in accordance with embodiments of the present invention. Although the filter component 30 is described in this disclosure in the context of such a hydrostatic transmission 10, it will be appreciated that the filter component is not limited to this example, but may be employed more generally in fluid systems in which fluid flows from a housing reservoir through a filter component located within the housing.

Referring to the example of FIG. 1, the hydrostatic transmission 10 includes a hydraulic pump assembly 12 enclosed or housed within a top housing 14, and a hydraulic motor assembly (not shown in this view). A pulley/fan assembly 16 is associated with the hydraulic pump assembly 12, which is driven by the prime mover to rotate an input shaft 18. Rotation of the input shaft 18 in turn drives rotation of the pump assembly 12. The pump assembly 12 may be configured as a piston-type pump including a plurality of reciprocating pistons, which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor. The hydrostatic transmission 10 further may include an end block 19 that provides a fluid connection to transmit hydraulic fluid between the pump assembly 12 and the motor. The hydrostatic transmission 10 further includes a charge pump 24 that is positioned by a charge pump cover 20, which is connected in fluid communication between the filter component and the pump assembly, which aids in maintaining appropriate fluid pressure within the system. The top housing 14 is coupled or fixed to the end block 19, which in turn is coupled or fixed to the charge pump cover 20, such that the top housing, end block, and charge pump cover cooperate to form an integrated or overall hydrostatic transmission housing 14/19/20 that defines a fluid reservoir 22 for the hydraulic fluid, and also forms an enclosure for the hydraulic pump assembly.

The resultant fluid reservoir 22 may define a sufficient volume in excess of the hydraulic fluid volume constituting an integral fluid expansion volume. The integral fluid expansion volume provides adequate space for the hydraulic fluid to expand during temperature changes, particularly during operation. By providing a fluid reservoir with adequate expansion volume integral in the enclosure formed by the top housing and end block, the hydraulic fluid of the hydrostatic transmission is isolated from other portions of the vehicle. This configuration has space-saving advantages by eliminating the need for any external expansion reservoir, whether shared or separate for the different wheels, as is required in some conventional configurations.

The hydrostatic transmission 10 further includes the filter component 30. The filter component is mounted to the charge pump cover 20 such that a filter media extends into the overall hydrostatic transmission housing 14/19/20 and into the fluid reservoir 22 within the top housing 14. Accordingly, the end block 19, charge pump cover 20, and top housing 14 must define holes of a width or diameter greater than a width or diameter of a cartridge portion of the filter component 30 so that the filter media can extend into the housing. The system pressure draws hydraulic fluid into the filter component such that fluid flows across the filter media. The hydraulic fluid then flows through the charge pump 24 to be pumped by the piston pump assembly 12. The hydraulic fluid is pumped through the hydraulic motor and flows on a return pathway back into the fluid reservoir 22 to complete the hydraulic fluid circuit.

Figure 2:
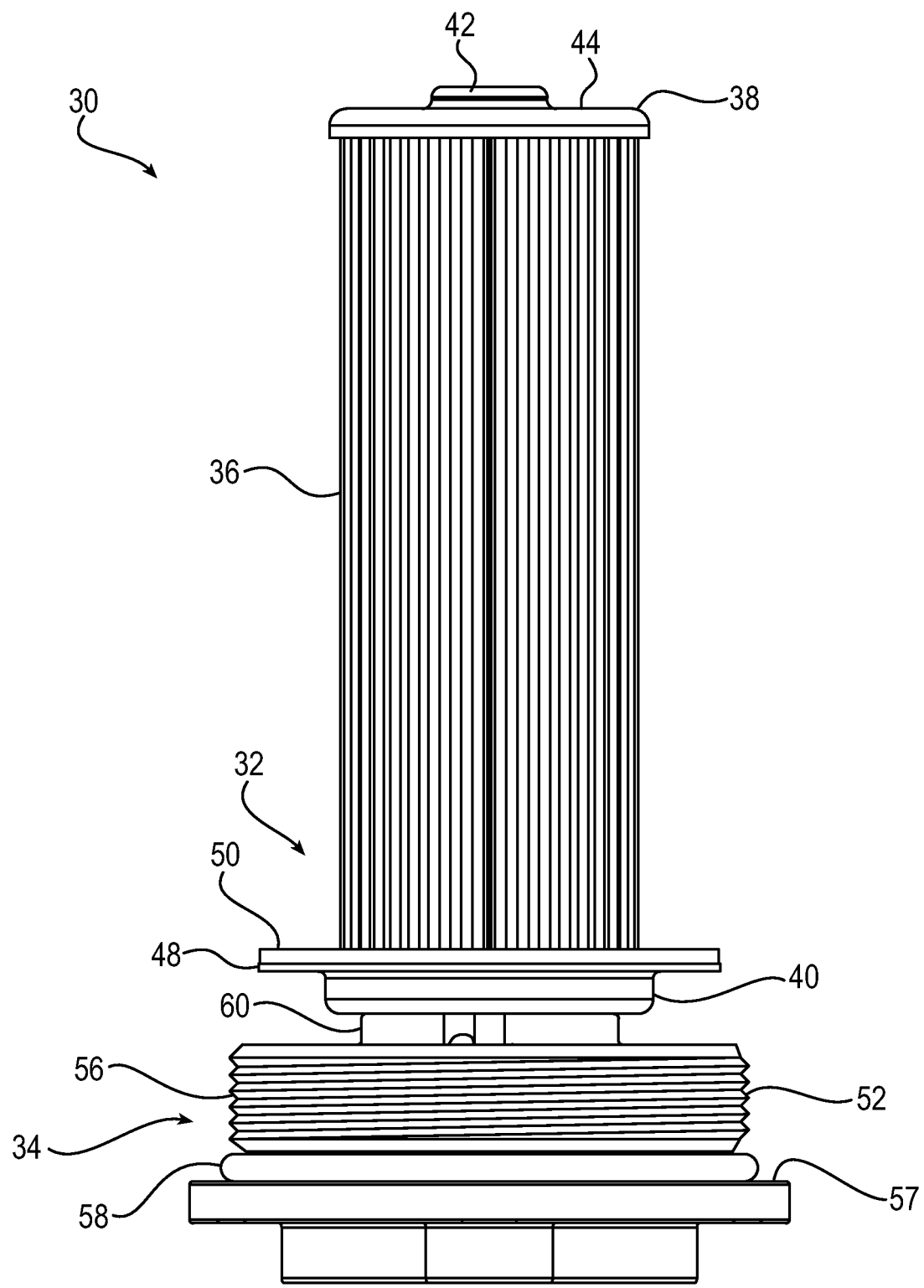
FIG. 2 is a drawing depicting a side view of an exemplary filter component this is employed in the hydrostatic transmission of FIG. 1.
Figure 3:
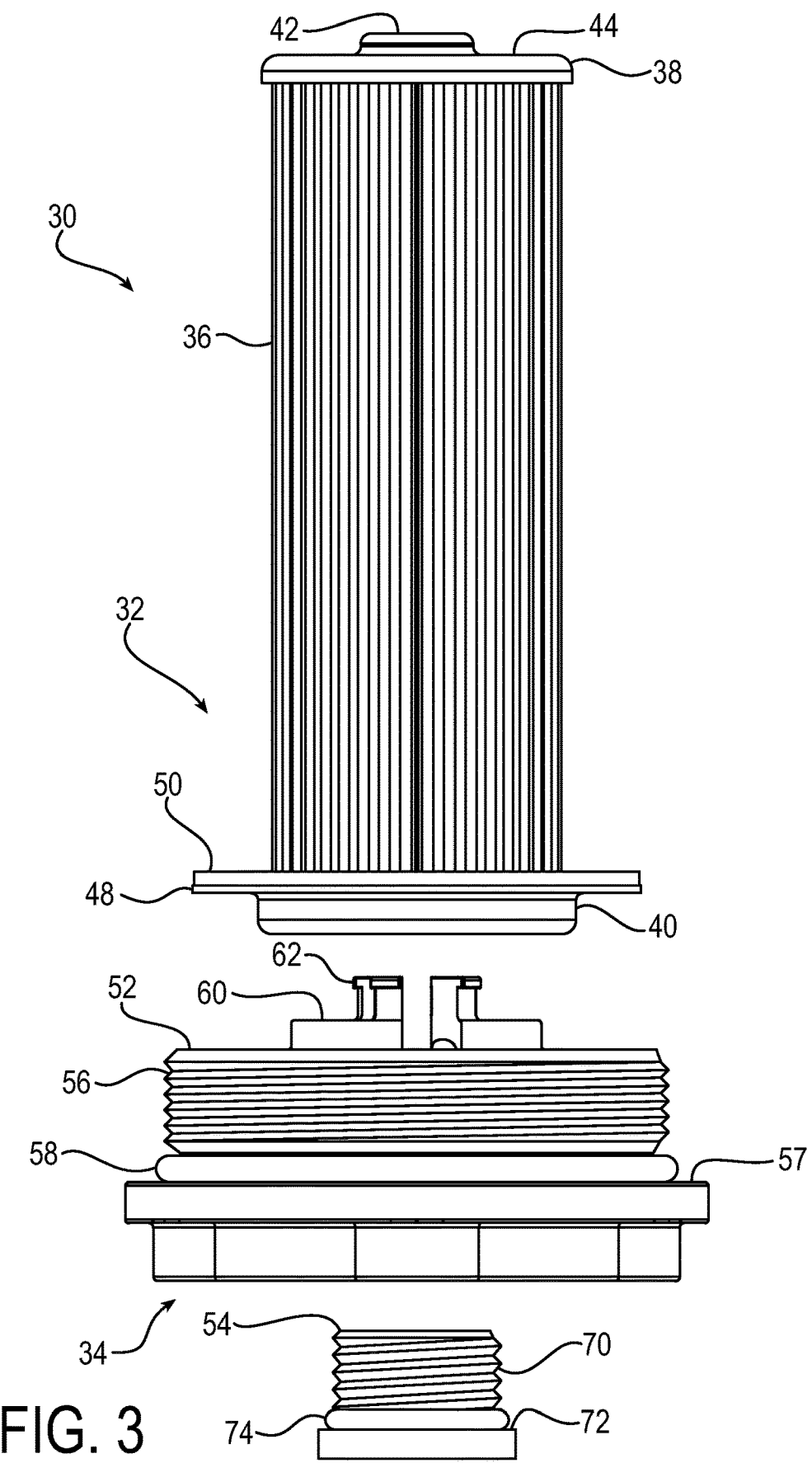
FIG. 3 is a drawing depicting an exploded view of the exemplary filter component of FIG. 2.
Figure 4:
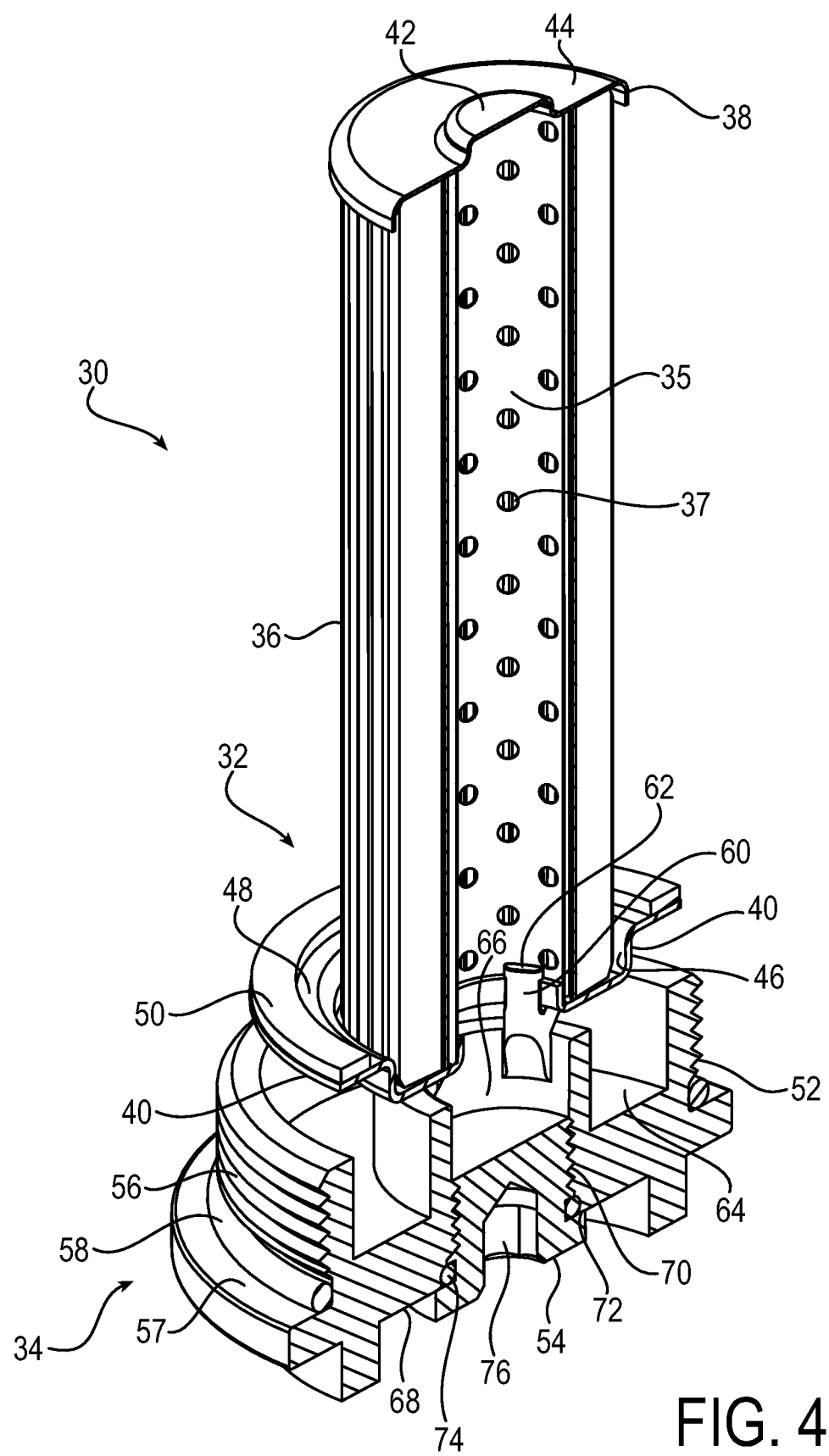
FIG. 4 is a drawing depicting a cross-sectional perspective view of the exemplary filter component of FIG. 2.

FIGS. 2-4 are drawings depicting various views of the exemplary filter component 30. In particular, FIG. 2 depicts a side view of the filter component 30, FIG. 3 depicts an exploded view, and FIG. 4 depicts a cross-sectional view. Generally, an aspect of the invention is an enhanced filter component that provides for a low mess, quick drain function to drain fluid. In exemplary embodiments, the filter component includes a cartridge portion including a filter media for filtering a fluid and defining a fluid flow path for fluid being filtered, and a plug assembly on which the cartridge portion is mounted and in fluid communication with the cartridge portion. The plug assembly comprises a first plug and a second plug, the first plug being larger than the second plug. The second plug is fixed to an inner surface of the first plug in an installed state and is removable from the first plug in a draining state, and the first plug defines a first flow path for communicating fluid from the fluid flow path of the cartridge portion to an outside of the filter component. The first plug further defines a drain port separate from the first flow path, wherein in the installed state the second plug plugs the drain port and in a draining state the second plug is removed from the first plug to permit draining fluid through the drain port.

Referring to the figures, the filter component 30 generally includes a cartridge portion 32 that is mounted onto a plug assembly 34. The cartridge portion 32 generally includes a filter media 36 that extends longitudinally between an end cap 38 and a filter seat 40. The filter media filters fluid that passes through the media and thus defines a fluid flow path for fluid being filtered. The filter media 36 is configured in a cylindrical form with a generally circular cross-section, although any suitable cross-sectional shape may be employed. The filter media 36 runs in a longitudinal direction between the end cap 38 and the filter seat 40. The cartridge portion 32 further may include an inner frame 35 that provides a support structure for the filter media 36. The inner frame 35 may define a plurality of flow orifices 37 that permit flow from the filter media and out of the cartridge portion. In a typical usage, the hydraulic fluid flows through the filter media and frame orifices and into the space defined by the inner frame, exiting from the bottom end of the cartridge portion where cartridge portion connects to the plug assembly. Hydraulic fluid then flows through the plug assembly, and then through porting 17 in the end block to the charge pump as referenced above. As the hydraulic fluid flows through the filter media 36, contaminants become trapped in the filter media thereby filtering the hydraulic fluid. The outer surface of the filter media 36 may be fluted or pleated as is conventional in the art.

The end cap 38 may have a "top hat" configuration including an inner cap protrusion 42 that extends from a cap face 44. This top hat design permits the end cap 38 to self-align upon installation of the filter component 30 within the top housing 14.

The filter seat 40 is shaped to define a recess 46 (see cross-sectional view of FIG. 4) that receives the filter media 36. The filter seat 40 further may have a stepped configuration to engage cooperatively stepped surfaces of the end block and top housing as detailed further below. The filter seat 40 further includes an upper face 48 on which there is supported an elastomeric sealing element 50. The sealing element 50 may be an SAE compliant face seal having a flat surface that seals the filter component against a sealing seat of the top housing 14 when the filter component 30 is in the installed state for use.

The plug assembly 34 may include a first plug 52 and a second plug 54, the first plug 52 being larger than the second plug 54. The plug assembly components may be made of any suitable rigid material, and rigid plastic materials are particularly suitable. As further detailed below, the first plug acts as a housing plug that plugs the hole through which the filter cartridge portion extends into the housing, and the second plug acts as a drain plug that may be removed from the housing plug to perform a draining function. The outer diameter of the first or larger plug 52 may include a threaded portion 56 and a ridge 57 that engage with the housing, and more specifically secure the plug assembly 34 to the charge pump cover 20. A first O-ring seal 58 may be provided on the ridge 57 to provide a seal against the housing, and more specifically against the charge pump cover 20. The first plug 52 further includes a connector 60 having a plurality of ridged projections 62. The ridged projections 62 can flex slightly so as to provide a snap-fit between the plug assembly 34 and the cartridge portion 32, whereby the ridged projections 62 engage with the filter seat 40 of the cartridge portion 32.

As most readily seen in the cross-sectional view of FIG. 4, the first plug 52 defines a first flow path 64 for communicating the filtered hydraulic fluid from the flow path of the cartridge portion to outside of the filter component. The flow through the first flow path may proceed into porting 17 of the charge pump cover 20. The filtered hydraulic fluid is then communicated to the charge pump. In addition, the first plug 52 defines a central drain port 66 separate from the first flow path 64, through which a quick drain function is performed. When the drain function is not being performed, the drain port 66 is plugged by the second plug 54, which therefore acts as a drain plug. As also best seen in the cross-sectional view of FIG. 4, the first plug 52 has an inner surface 68 that may be stepped and/or threaded to engage with a cooperating stepped and/or threaded outer surface of the second and smaller plug 54.

Accordingly, the outer surface of the second and smaller drain plug 54 may include a threaded portion 70 and a step portion 72 that engage with the inner surface 68 of the first and larger housing plug 52 to fix the second plug to the first plug. In this manner, the first plug 52 and second plug 54 are fixed together during use to form the plug assembly 34. A second O-ring 74 seal may be provided on the step portion 72 of the second plug 54 to provide a seal against the first plug 52. The second plug 54 further may define a recess 76 or other suitable structure that is engaged for removing the second plug from the first plug to expose the drain port 66. For example, the recess may be configured to receive a tool or implement by which the second plug 54 may be removed and separated from the first plug 52 to expose the drain port 66. In this manner, in the installed state the second plug plugs the drain port and in a draining state the second plug is removed from the first plug to permit draining fluid through the drain port.

Generally, the enhanced filter component may be incorporated into a hydrostatic transmission including a housing defining a fluid reservoir, a pump assembly that pumps the fluid through the hydrostatic transmission, and the filter component, wherein in the installed state the pump assembly pumps the fluid through the filter component to filter the fluid. In the installed state, the cartridge portion extends through a hole in the housing and the first plug tightly engages the housing to prevent leakage of fluid from the fluid reservoir through the hole. The housing defines porting 17 in fluid communication with the first flow path defined by the first plug such that in the installed state, fluid flows through the first flow path defined by the first plug and into the porting 17 defined by the housing. In the draining state, the first plug is loosened from the housing whereby the housing and the filter component define a draining flow path external from the cartridge portion through which the fluid flows into the drain port.

Figure 5:
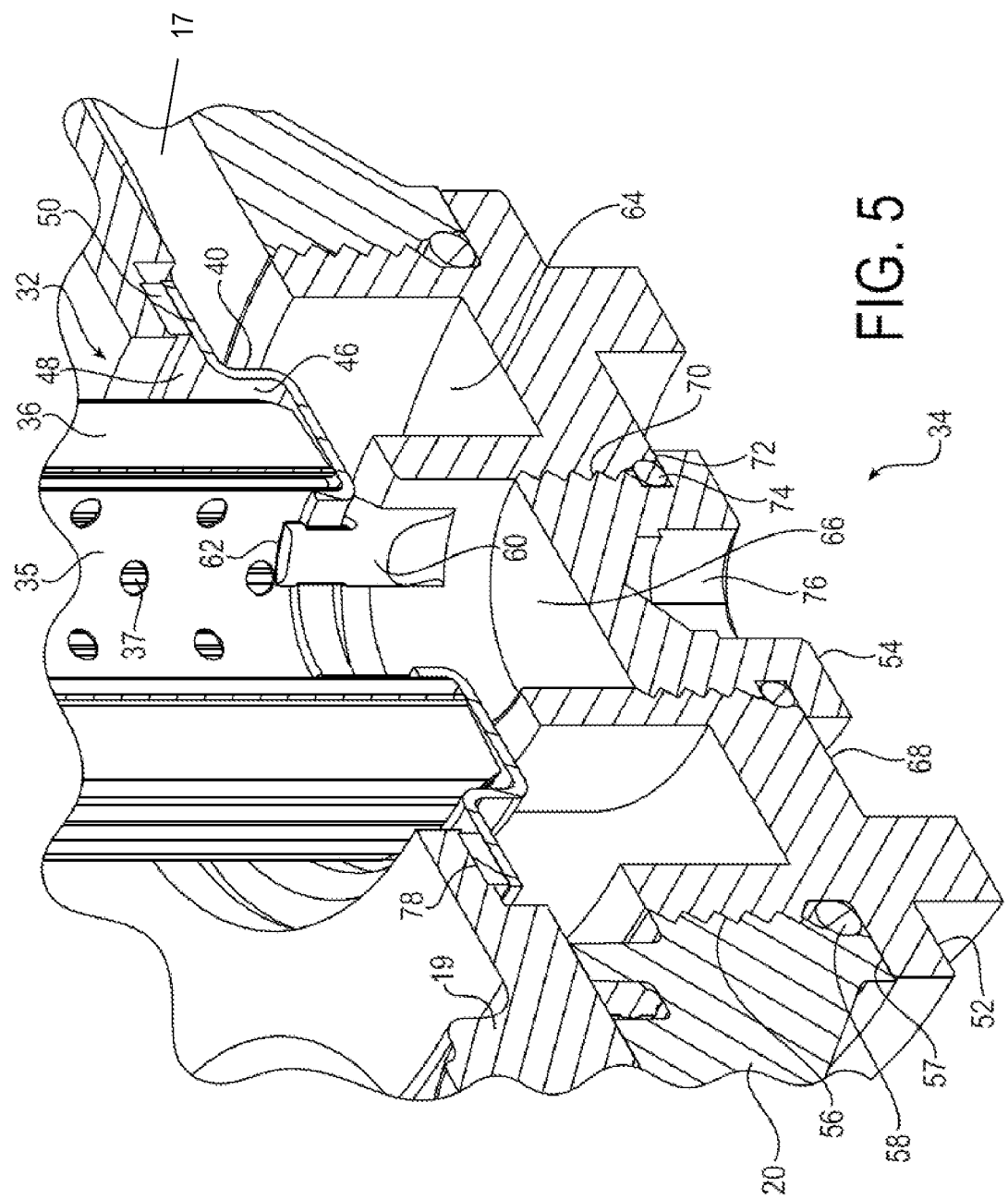
FIG. 5 is a drawing depicting a close-up perspective cross-sectional view of the hydrostatic transmission with filter component of FIG. 1 with the filter component in an installed state, in the region around the plug assembly of the filter component.
Figure 6:
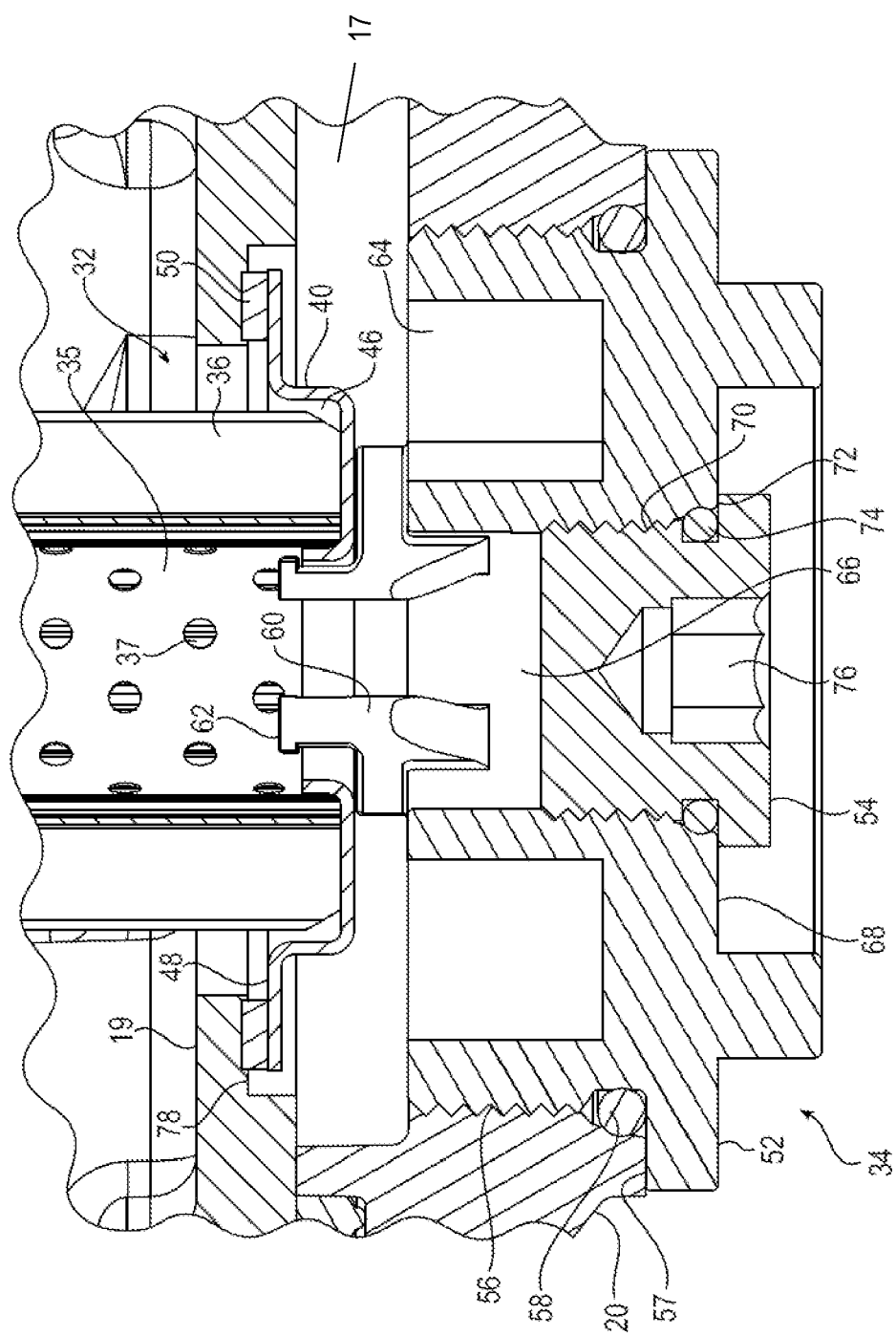
FIG. 6 is a drawing depicting a close-up side cross-sectional view of the hydrostatic transmission with filter component of FIG. 1 with the filter component in the installed state, in the region around the plug assembly of the filter component.

FIG. 1 depicts the hydrostatic transmission 10 with the filter component 30 in the installed state for operation of the hydrostatic transmission. FIGS. 5 and 6 are drawings depicting more close-up cross-sectional views of the hydrostatic transmission 10 and filter component 30 with the filter component in the installed state in the region around the plug assembly 34, with FIG. 5 being a more perspective cross-sectional view and FIG. 6 being a more side cross-sectional view.

As referenced above, the end block 19 and charge pump cover 20 must define holes of a width or diameter greater than a width or diameter of the cartridge portion 32 of the filter component 30 so that the filter media can extend into the hydrostatic transmission housing. In the installed state the first and larger housing plug 52 and second and smaller drain plug 54 are joined together as the plug assembly 34. The plug assembly 34 is fixed to the housing 14/19/20, particularly by fastening the plug assembly 34 to the charge pump cover 20 with maximum tightness. In this installed state, the first plug 52 acts as a housing plug that plugs the hole in the hydrostatic transmission housing where the cartridge portion of the filter component enters the housing. With the plug assembly 34 tightened onto the charge pump cover 20, the sealing element 50 of the filter component 30 is pressed against a sealing set of the housing 14/19/20 to seal against the housing to prevent leakage. In the example configuration of FIGS. 1 and 5-6, the sealing element 50 is configured as a face seal that is pressed against a sealing seat 78 of the end block 19.

In such installed state, during operation hydraulic fluid is drawn from the fluid reservoir defined by the hydrostatic transmission housing and through the filter component. More particularly, the hydraulic fluid flows through the filter media and into the flow channel defined by the inner frame of the filter component. The hydraulic fluid then flows through the first flow path 64 defined by first and larger housing plug 52 (see again, e.g., FIG. 4) to exit the filter component. As referenced above, the hydraulic fluid then flows through porting 17 in the end block and charge pump cover to the charge pump for circulation through the piston pump and motor portions of the system.

Figure 7:
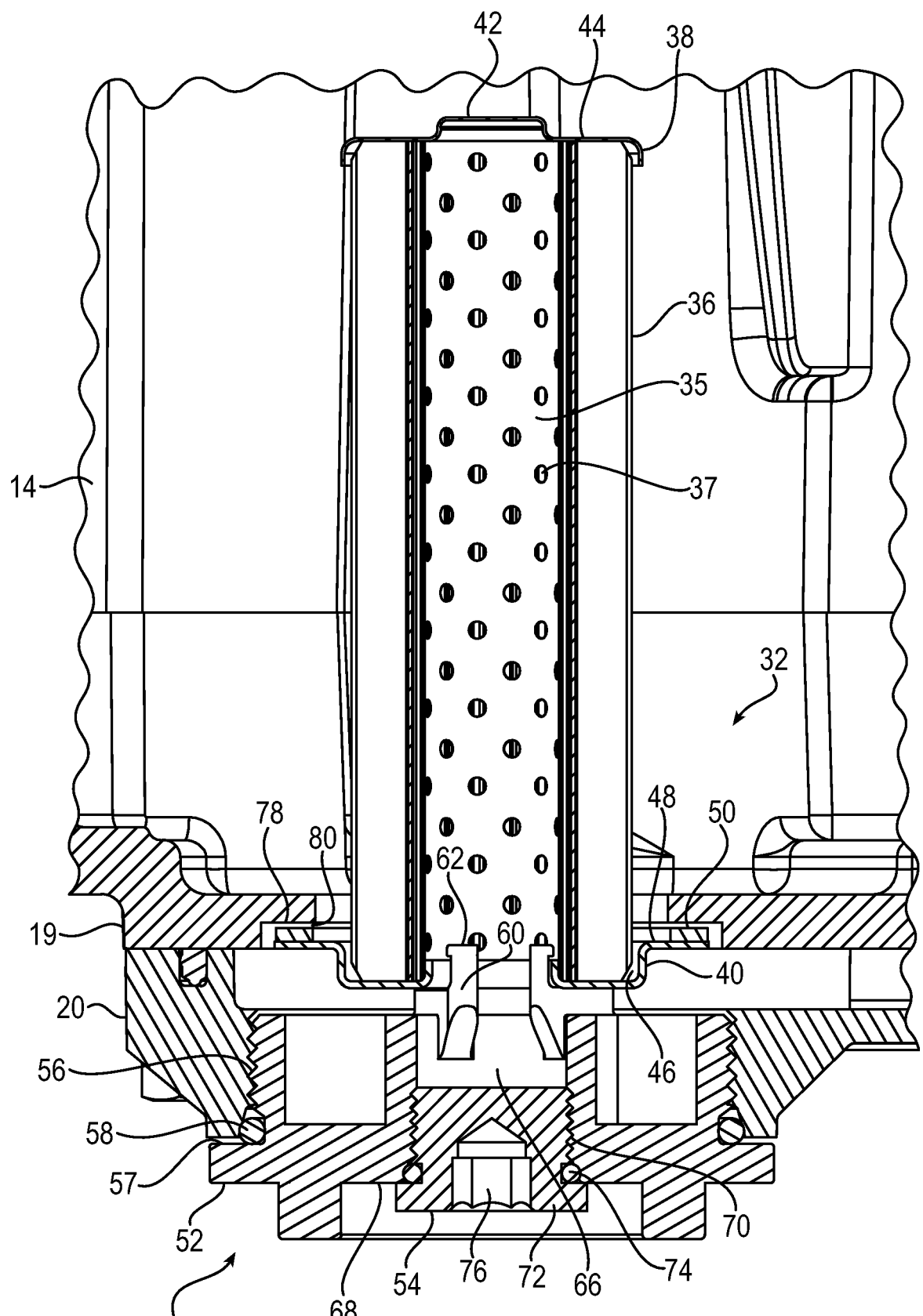
FIG. 7 is a drawing depicting a close-up side cross-sectional view of the hydrostatic transmission with filter component of FIG. 1, but with the filter component in a draining state.
Figure 8:
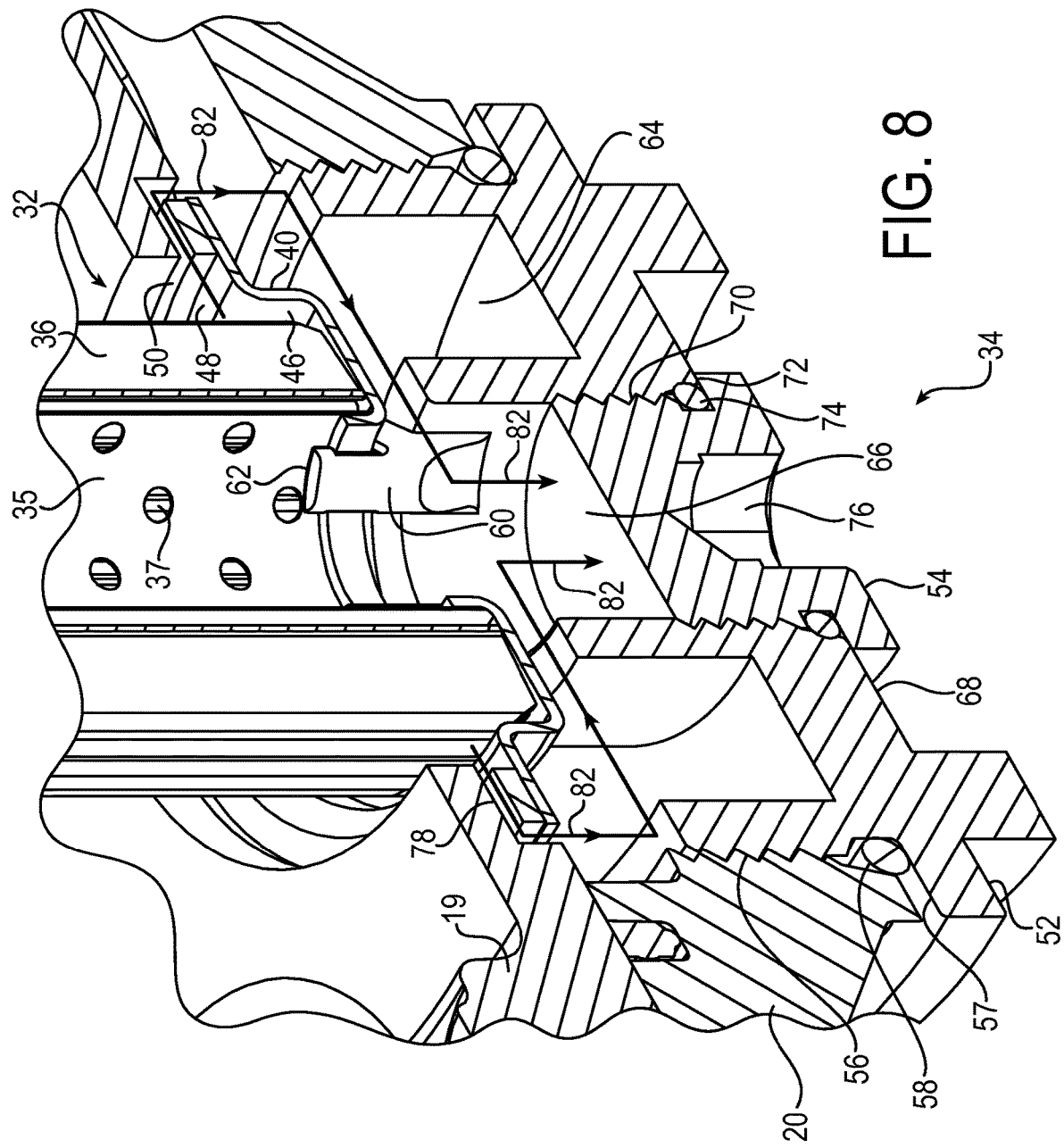
FIG. 8 is a drawing depicting a close-up perspective cross-sectional view of the hydrostatic transmission with filter component of FIGS. 1 and 7 with the filter component in the draining state, in the region around the plug assembly of the filter component.
Figure 9:
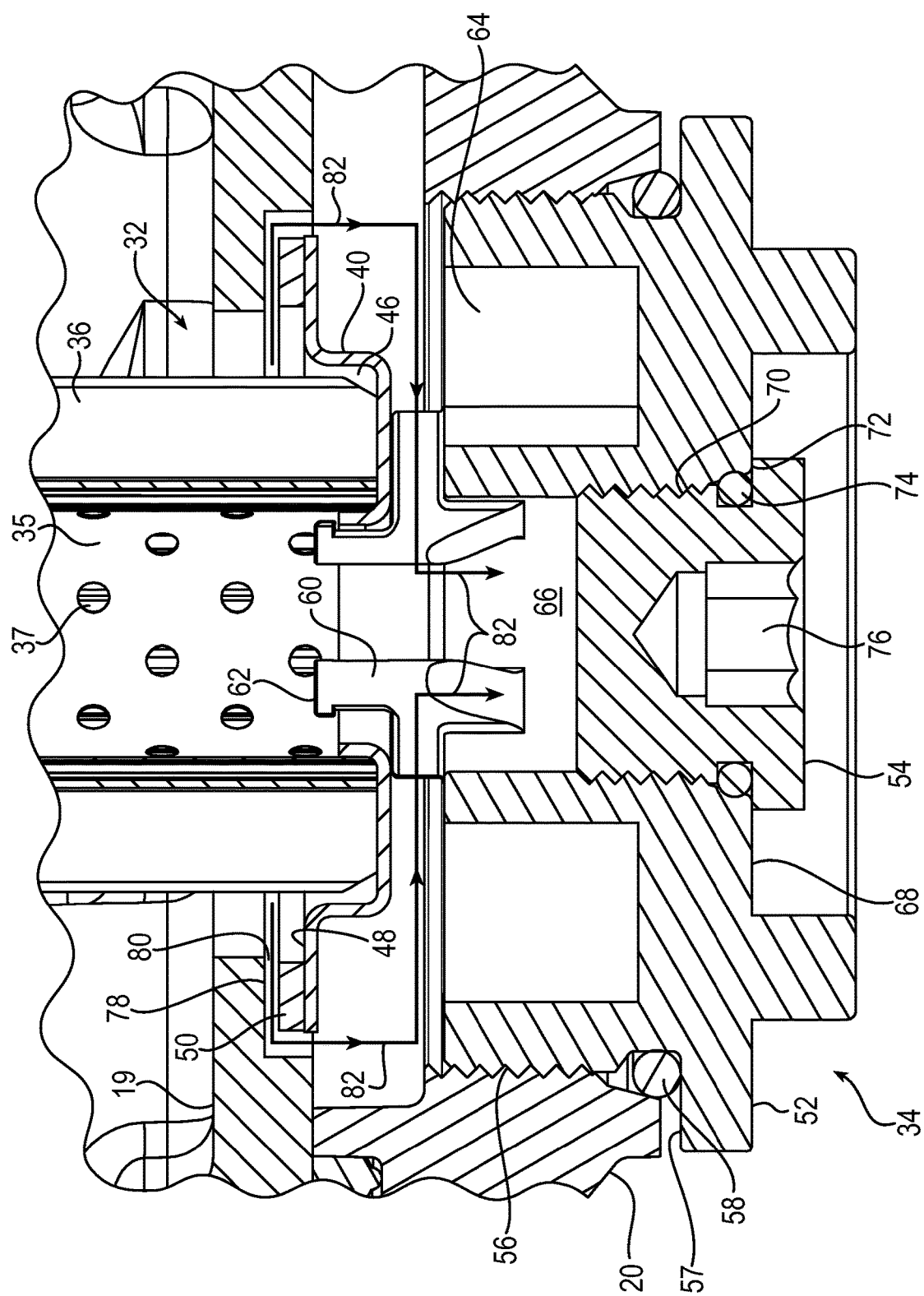
FIG. 9 is a drawing depicting a close-up side cross-sectional view of the hydrostatic transmission with filter component of FIGS. 1 and 7 with the filter component in the draining state, in the region around the plug assembly of the filter component.

The filter component 30 with the plug assembly 34 provides an enhanced quick drain function when the filter component and/or hydraulic fluid need to be changed. The quick drain function results in a fast but controlled drain of hydraulic fluid that avoids mess associated with conventional configurations. FIG. 7 is a drawing depicting a close-up side cross-sectional view of the hydrostatic transmission 10 and filter component 30 with the filter component in a draining state. FIGS. 8 and 9 are drawings depicting more close-up cross-sectional views of the hydrostatic transmission 10 and filter component 30 with the filter component in the draining state particularly in the region around the plug assembly 34, with FIG. 8 being a more perspective cross-sectional view and FIG. 9 being a more side cross-sectional view.

In the draining state, the plug assembly 34 is loosened from the hydrostatic transmission housing relative to the maximum tightness of the installed state referenced above. In the draining state with the plug assembly loosened, the sealing element 50 is pulled away from the sealing position of the installed state against the sealing seat 78 of the hydrostatic transmission housing. In particular, when the plug assembly 34 is loosened relative to the charge pump cover 20, the face seal 50 is moved off of the sealing seat 78 of the end block 19. This loosening results in a gap 80 being formed between the sealing element 50 and sealing seat 78 of the end block 19 to permit draining of the hydraulic fluid.

FIGS. 8 and 9 include arrows 82 that illustrate the flow of hydraulic fluid in the draining state. With the sealing element 50 moved from the sealing position, a draining flow of hydraulic fluid can flow through the gap 80 and around the outside of the filter seat 40, thereby flowing around and externally from the cartridge portion 32 of filter component 30. This draining flow then flows into the drain port 66 defined by the first and larger plug 52, rather than through the flow path 64 to the charging pump. In this manner, in the draining state when the first plug is loosened from the housing, the housing and the filter component define a draining flow path external from the cartridge portion through which the fluid flows into the drain port. Initially, the drain port 66 is plugged by the second and smaller plug 54, which acts as a drain plug to prevent immediate draining. When the operator wishes to drain the hydraulic fluid from the hydrostatic transmission housing, the second or drain plug 54 is removed from the first housing plug 52 to expose the drain port 66 to the outside. The hydraulic fluid then drains through the drain port 66.

The enhanced plug assembly permits a fast but controlled quick drain function that avoids the mess associated with conventional configurations. Conventional filter components include a singular plug, and as referenced above the hole in the hydrostatic transmission housing must have a sufficient diameter or width to accommodate the full corresponding width and diameter of the cartridge portion of the filter. As soon as the singular plug of the conventional filter component is loosened, hydraulic fluid begins to spill from this large hole in the hydrostatic transmission housing in an uncontrolled fashion, which can result in a mess that is inconvenient and time consuming to clean up.

In contrast, with the configuration of the plug assembly 34, when the filter component is loosened the hydraulic fluid flows into the drain port 66 defined by the first and larger housing plug 52. Initially, the drain port 66 is plugged by the second and smaller drain plug 54, so there is no spillage of hydraulic fluid upon loosening of the filter component. The user can then control the initiation of draining by removal of the drain plug 54 from the housing plug 52. The drain port 66 is smaller than the hole plugged by the larger housing plug 52 that accommodates the cartridge portion of the filter component, so draining is more controlled as compared to conventional configurations, and spillage is avoided. In addition, the drain port 66 still is sufficiently large for efficient draining of the hydraulic fluid. Once the hydraulic fluid is drained completely from the hydrostatic transmission housing, the filter component can be removed by fully disengaging the housing plug 52 from the hydrostatic transmission housing.

An aspect of the invention, therefore, is an enhanced filter component that provides for a low mess, quick drain function to drain fluid. In exemplary embodiments, the filter component includes a cartridge portion including a filter media for filtering a fluid and defining a fluid flow path for fluid being filtered, and a plug assembly on which the cartridge portion is mounted and in fluid communication with the cartridge portion. The plug assembly comprises a first plug and a second plug, the first plug being larger than the second plug; the second plug is fixed to an inner surface of the first plug in an installed state and is removable from the first plug in a draining state; the first plug defines a first flow path for communicating fluid from the fluid flow path of the cartridge portion to an outside of the filter component; and the first plug further defines a drain port separate from the first flow path, wherein in the installed state the second plug plugs the drain port and in a draining state the second plug is removed from the first plug to permit draining fluid through the drain port. The filter element may include one or more of the following features, either individually or in combination.

In an exemplary embodiment of the filter element, an outer surface of the second plug has a threaded portion and a step portion that engage with an inner surface of the first plug to fix the second plug to the first plug.

In an exemplary embodiment of the filter element, the filter element further includes a seal located on the step portion of the second plug to provide a seal between the first plug and the second plug.

In an exemplary embodiment of the filter element, the second plug defines a recess to engage for removing the second plug from the first plug.

In an exemplary embodiment of the filter element, the cartridge portion includes a filter seat that defines a recess that receives the filter media.

In an exemplary embodiment of the filter element, the first plug includes a connector having a plurality of ridged projections that provide a snap fit between the plug assembly and the cartridge portion by engagement with the filter seat.

In an exemplary embodiment of the filter element, the filter element further includes a sealing element positioned on an upper face of the filter seat.

In an exemplary embodiment of the filter element, the sealing element is configured as a face seal having a flat sealing surface.

In an exemplary embodiment of the filter element, the cartridge portion further includes an end cap, and the filter media runs between the filter seat and the end cap.

In an exemplary embodiment of the filter element, the end cap has a top hat configuration for self-aligning the filter component in use, and the top hat configuration includes a protrusion that extends from a cap face.

The enhanced filter component may be incorporated into a hydrostatic transmission including a housing defining a fluid reservoir; a pump assembly that pumps the fluid through the hydrostatic transmission; and the filter component of any of the embodiments, wherein in the installed state the pump assembly pumps the fluid through the filter component to filter the fluid. In exemplary embodiments of the hydrostatic transmission, in the installed state, the cartridge portion extends through a hole in the housing and the first plug tightly engages the housing to prevent leakage of fluid from the fluid reservoir through the hole. The housing defines porting in fluid communication with the first flow path defined by the first plug such that in the installed state, fluid flows through the first flow path defined by the first plug and into the porting defined by the housing. In the draining state, the first plug is loosened from the housing whereby the housing and the filter component define a draining flow path external from the cartridge portion through which the fluid flows into the drain port. The hydrostatic transmission may include one or more of the following features, either individually or in combination.

In an exemplary embodiment of the hydrostatic transmission, the housing comprises a top housing that is fixed to an end block, and a charge pump cover that is fixed to the end block on a side opposite from the top housing, and the first plug engages the charge pump cover of the housing.

In an exemplary embodiment of the hydrostatic transmission, the charge pump cover defines the porting in fluid communication with the first flow path of the first plug.

In an exemplary embodiment of the hydrostatic transmission, an outer diameter of the first plug has a threaded portion and a ridge that engage with an inner surface of the housing to fix the plug assembly to the housing.

In an exemplary embodiment of the hydrostatic transmission, the hydrostatic transmission further includes a seal located on the ridge of the first plug to provide a seal between the first plug and the housing.

In an exemplary embodiment of the hydrostatic transmission, the hydrostatic transmission further includes a charge pump connected in fluid communication between the filter component and the pump assembly.

In an exemplary embodiment of the hydrostatic transmission, the cartridge portion of the filter element includes a filter seat that defines a recess that receives the filter media, and a sealing element positioned on an upper face of the filter seat; and the housing includes a sealing seat against which the sealing element seals in the installed state, and the sealing element is removed from the sealing seat in the draining state.

In an exemplary embodiment of the hydrostatic transmission, the housing comprises a top housing that is fixed to an end block, and the sealing seat is part of end block.

In an exemplary embodiment of the hydrostatic transmission, the sealing element is configured as a face seal having a flat sealing surface that seals against a flat surface of the sealing seat in the installed state.

In an exemplary embodiment of the hydrostatic transmission, the hole through which the cartridge portion extends into the housing has a larger area than the drain port.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter component comprising:
a cartridge portion including a filter media for filtering a fluid and defining a fluid flow path for fluid being filtered; and
a plug assembly on which the cartridge portion is mounted and in fluid communication with the cartridge portion;
wherein:
the plug assembly comprises a first plug and a second plug, the first plug being larger than the second plug;
the second plug is fixed to an inner surface of the first plug in an installed state and is removable from the first plug in a draining state;
the first plug defines a first flow path for communicating fluid from the fluid flow path of the cartridge portion to an outside of the filter component; and
the first plug further defines a drain port separate from the first flow path, wherein in the installed state the second plug plugs the drain port and in a draining state the second plug is removed from the first plug to permit draining fluid through the drain port.

2. The filter component of claim 1, wherein an outer surface of the second plug has a threaded portion and a step portion that engage with an inner surface of the first plug to fix the second plug to the first plug.

3. The filter component of claim 2, further comprising a seal located on the step portion of the second plug to provide a seal between the first plug and the second plug.

4. The filter component of claim 1, wherein the second plug defines a recess to engage for removing the second plug from the first plug.

5. The filter component of claim 1, wherein the cartridge portion includes a filter seat that defines a recess that receives the filter media.

6. The filter component of claim 5, wherein the first plug includes a connector having a plurality of ridged projections that provide a snap fit between the plug assembly and the cartridge portion by engagement with the filter seat.

7. The filter component of claim 5, further comprising a sealing element positioned on an upper face of the filter seat.

8. The filter component of claim 7, wherein the sealing element is configured as a face seal having a flat sealing surface.

9. The filter component of claim 5, wherein the cartridge portion further includes an end cap, and the filter media runs between the filter seat and the end cap.

10. The filter component of claim 9, wherein the end cap has a top hat configuration for self-aligning the filter component in use, and the top hat configuration includes a protrusion that extends from a cap face.

11. A hydrostatic transmission comprising:
a housing defining a fluid reservoir;
a pump assembly that pumps the fluid through the hydrostatic transmission; and
the filter component of claim 1, wherein in the installed state the pump assembly pumps the fluid through the filter component to filter the fluid;
and wherein:
in the installed state, the cartridge portion extends through a hole in the housing and the first plug tightly engages the housing to prevent leakage of fluid from the fluid reservoir through the hole;
the housing defines porting in fluid communication with the first flow path defined by the first plug such that in the installed state, fluid flows through the first flow path defined by the first plug and into the porting defined by the housing; and
in the draining state, the first plug is loosened from the housing whereby the housing and the filter component define a draining flow path external from the cartridge portion through which the fluid flows into the drain port.

12. The hydrostatic transmission of claim 11, wherein the housing comprises a top housing that is fixed to an end block, and a charge pump cover that is fixed to the end block on a side opposite from the top housing, and the first plug engages the charge pump cover of the housing.

13. The hydrostatic transmission of claim 12, wherein the charge pump cover defines the porting in fluid communication with the first flow path of the first plug.

14. The hydrostatic transmission of claim 11, wherein an outer diameter of the first plug has a threaded portion and a ridge that engage with an inner surface of the housing to fix the plug assembly to the housing.

15. The hydrostatic transmission of claim 14, further comprising a seal located on the ridge of the first plug to provide a seal between the first plug and the housing.

16. The hydrostatic transmission of claim 11, further comprising a charge pump connected in fluid communication between the filter component and the pump assembly.

17. The hydrostatic transmission of claim 11, wherein:
the cartridge portion of the filter element includes a filter seat that defines a recess that receives the filter media, and a sealing element positioned on an upper face of the filter seat; and
the housing includes a sealing seat against which the sealing element seals in the installed state, and the sealing element is removed from the sealing seat in the draining state.

18. The hydrostatic transmission of claim 17, wherein the housing comprises a top housing that is fixed to an end block, and the sealing seat is part of end block.

19. The filter component of claim 17, wherein the sealing element is configured as a face seal having a flat sealing surface that seals against a flat surface of the sealing seat in the installed state.

20. The hydrostatic transmission of claim 11, wherein the hole through which the cartridge portion extends into the housing has a larger area than the drain port.

* * * * *